(No Model.)
T. F. McCAFFREY.
COFFEE AND NUT ROASTER.
No. 256,718. Patented Apr. 18, 1882.
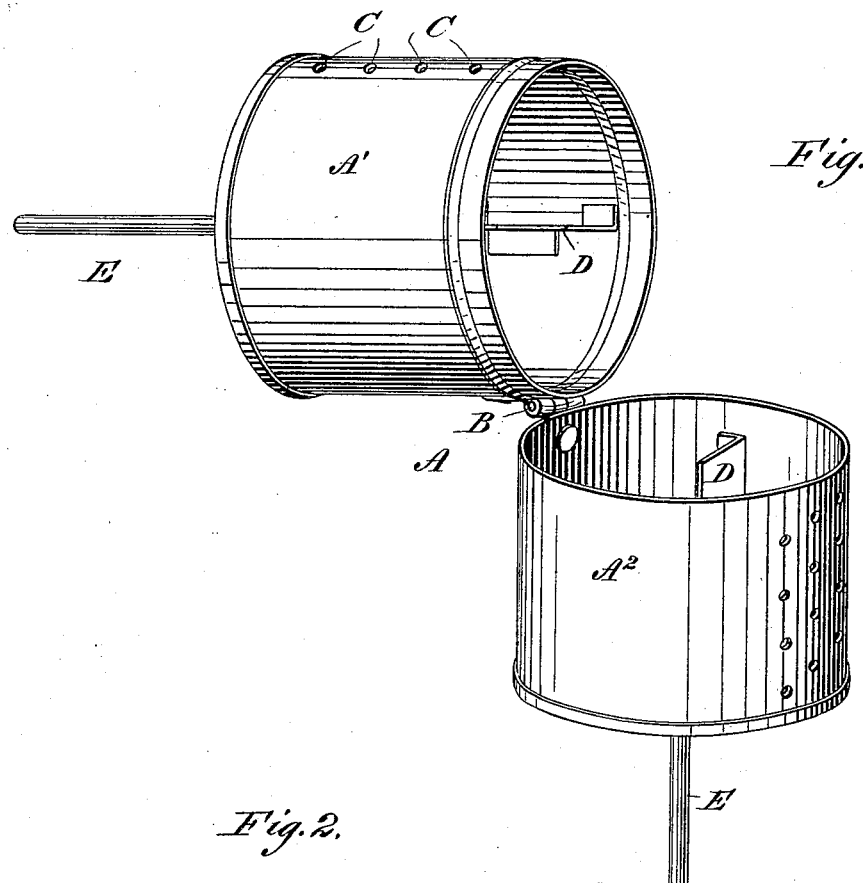
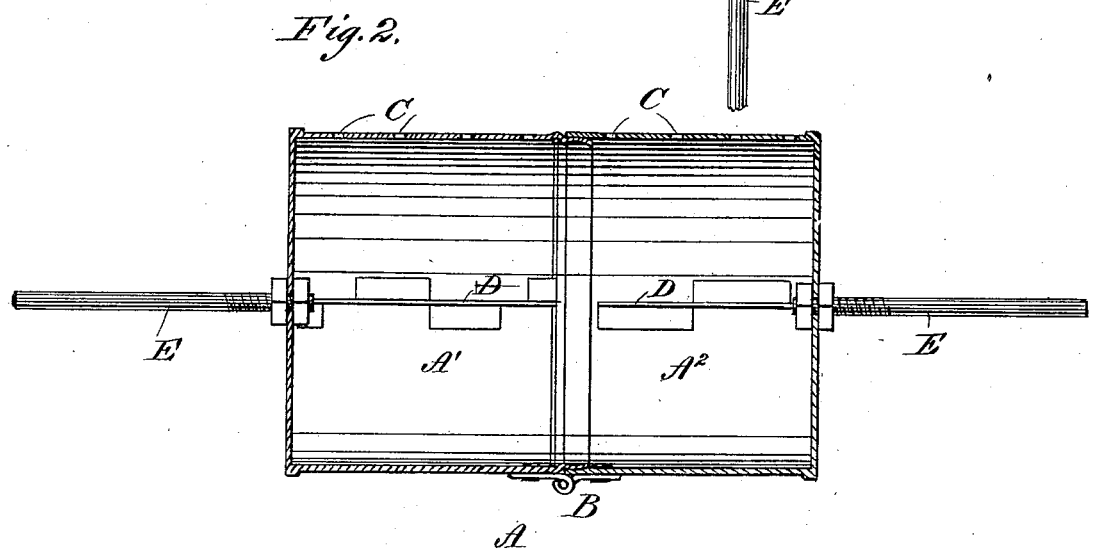
WITNESSES:
Donn Twitchell
C. Sedgwick
INVENTOR:
T. F. McCaffrey
BY Munn &Co
ATTORNEYS.

United States Patent Office.

THOMAS F. McCAFFREY, OF PHILADELPHIA, PENNSYLVANIA.

COFFEE AND NUT ROASTER.

SPECIFICATION forming part of Letters Patent No. 256,718, dated April 18, 1882.

Application filed February 10, 1882. (No model.)

*To all whom it may concern:*

Be it known that I, THOMAS F. MCCAFFREY, of the city and county of Philadelphia, and State of Pennsylvania, have invented an Improved Coffee and Nut Roaster, of which the following is a full, clear, and exact description.

The object of my invention is to facilitate filling a coffee and nut roaster and to permit of convenient examination of the contents of the roaster during the operation of roasting.

The invention consists in a coffee and nut roaster formed of two cylindrical sections, each provided with an open and a closed end, which sections are hinged to each other at the open ends. The sections are provided with apertures and with internally-projecting ridges or strips, and a rod projects from the closed end of each section, these rods forming the shaft of the roaster.

Reference is to be had to the accompanying drawings, forming part of this specification, in which similar letters of reference indicate corresponding parts in both the figures.

Figure 1 is a perspective view of my improved coffee and nut roaster, showing it opened. Fig. 2 is a longitudinal sectional elevation of the same, showing it closed.

The cylinder A, made of sheet metal, preferably sheet-iron, consists of two sections, A' A², each provided with a closed and an open end, which sections are hinged to each other at the open ends by a hinge, B. The edge of the section A' is slightly contracted, so as to fit into the end of the section A². If desired, the cylinder can be provided with a hasp or latch to lock the two sections A' A² together when the cylinder is closed. Each section of the cylinder is provided with a series of apertures, C, for the entrance and exit of air. One or more ridges or strips, D, project from the inner surface of each section A' A², which strips are firmly secured to the sections, and serve to throw the contents of the cylinder about in the same, so that the contents will not be burned or charred by continually resting on the same spot of the cylinder, which is very apt to take place if the cylinder is rotated rapidly. A rod or thick wire, E, projects from the closed end of each section A' A², and these rods form the shaft on which the cylinder is rotated. The cylinder can be made of any desired or suitable size. It can be readily opened to be filled and to examine the contents during the roasting process. It is specially adapted for roasting small quantities or samples of nuts, coffee, &c., and is also very well adapted for family use.

Having thus fully described my invention, I claim as new and desire to secure by Letters Patent—

1. An improved coffee roaster, consisting of two open-ended cylindrical sections hinged together at their open ends, with the end of one projecting into the other, and provided with pivots projecting from their closed ends, substantially as herein shown and described.

2. In a coffee and nut roaster, the combination, with the cylindrical sections A' A², provided with apertures C, of the hinge B, uniting the two sections, substantially as herein shown and described, and for the purpose set forth.

3. In a coffee and nut roaster, the combination, with the sections A' A², provided with apertures C C, and internal projecting strips, D, of the hinge B, uniting the two sections, substantially as herein shown and described, and for the purpose set forth.

THOMAS F. McCAFFREY.

Witnesses:
J. CARROLL MCCAFFREY,
FRANK I. THOMPSON.